United States Patent
Doumit

[11] Patent Number: 6,147,613
[45] Date of Patent: Nov. 14, 2000

[54] EARLY WARNING WATER LEAK DETECTION SYSTEM

[76] Inventor: Joseph Doumit, 1301 W. Main St., New Iberia, La. 70560

[21] Appl. No.: 09/457,415

[22] Filed: Dec. 7, 1999

Related U.S. Application Data

[63] Continuation-in-part of application No. 09/099,651, Jun. 18, 1998, abandoned.

[51] Int. Cl.[7] .................................................. G08B 21/00
[52] U.S. Cl. .......................... 340/605; 340/604; 340/534; 340/525; 137/312
[58] Field of Search .................................... 340/605, 604, 340/532, 533, 534, 524, 525; 137/312

[56] References Cited

U.S. PATENT DOCUMENTS

| | | | |
|---|---|---|---|
| 4,090,193 | 5/1978 | Hinkle, Jr. | 340/412 |
| 4,122,389 | 10/1978 | Haagen | 324/65 R |
| 4,305,420 | 12/1981 | Nussdorf | 137/312 |
| 4,374,379 | 2/1983 | Dennision, Jr. | 340/604 |
| 4,736,195 | 4/1988 | McMurtry et al. | 340/568 |
| 4,843,305 | 6/1989 | Akiba | 340/605 |
| 5,190,069 | 3/1993 | Richards | 137/312 |
| 5,202,667 | 4/1993 | Alvin | 340/605 |
| 5,229,750 | 7/1993 | Welch, Jr. et al. | 340/605 |
| 5,428,347 | 6/1995 | Barron | 340/604 |
| 5,469,365 | 11/1995 | Diekema et al. | 340/483 |
| 5,637,789 | 6/1997 | Lawson | 73/40.5 R |
| 5,655,561 | 8/1997 | Wendel et al. | 137/59 |

*Primary Examiner*—Julie Lieu
*Attorney, Agent, or Firm*—Harrison & Egbert

[57] ABSTRACT

A system for early detection of water leaks at particular locations in any water-dependent appliance and apparatus used in buildings such as homes, townhouses, apartments, mobile homes, and offices. A central control apparatus electrically interconnected with a plurality of circuits which enable water leaks to be accurately detected in a diversity of devices including air conditioners, compressor coils, hot water appliances, and pipes, and for communicating the severity of the water-related problem. A plurality of water sensors are incorporated into specially designed probes of the preferred embodiment of the present invention wherein water leaks may be accurately and reliably detected in a diversity of water-dependent appliances and devices. A fiber glass cloth means functions as a probe for sensing water leaks via its built-in plurality of sensors constructed from a corresponding plurality of conductive wires enables the location and extent of a water leak to be ascertained. The apparatus is designed to be easily installed and to be inherently devoid of any safety hazards. Specially color-coded wires enable particular appliances and pipes to be properly interconnected wherein water leaks may be detected early enough to prevent consequent water-damage. A telephone interface enables early warnings and alerts of water leaks to be communicated via conventional telephone lines.

44 Claims, 8 Drawing Sheets

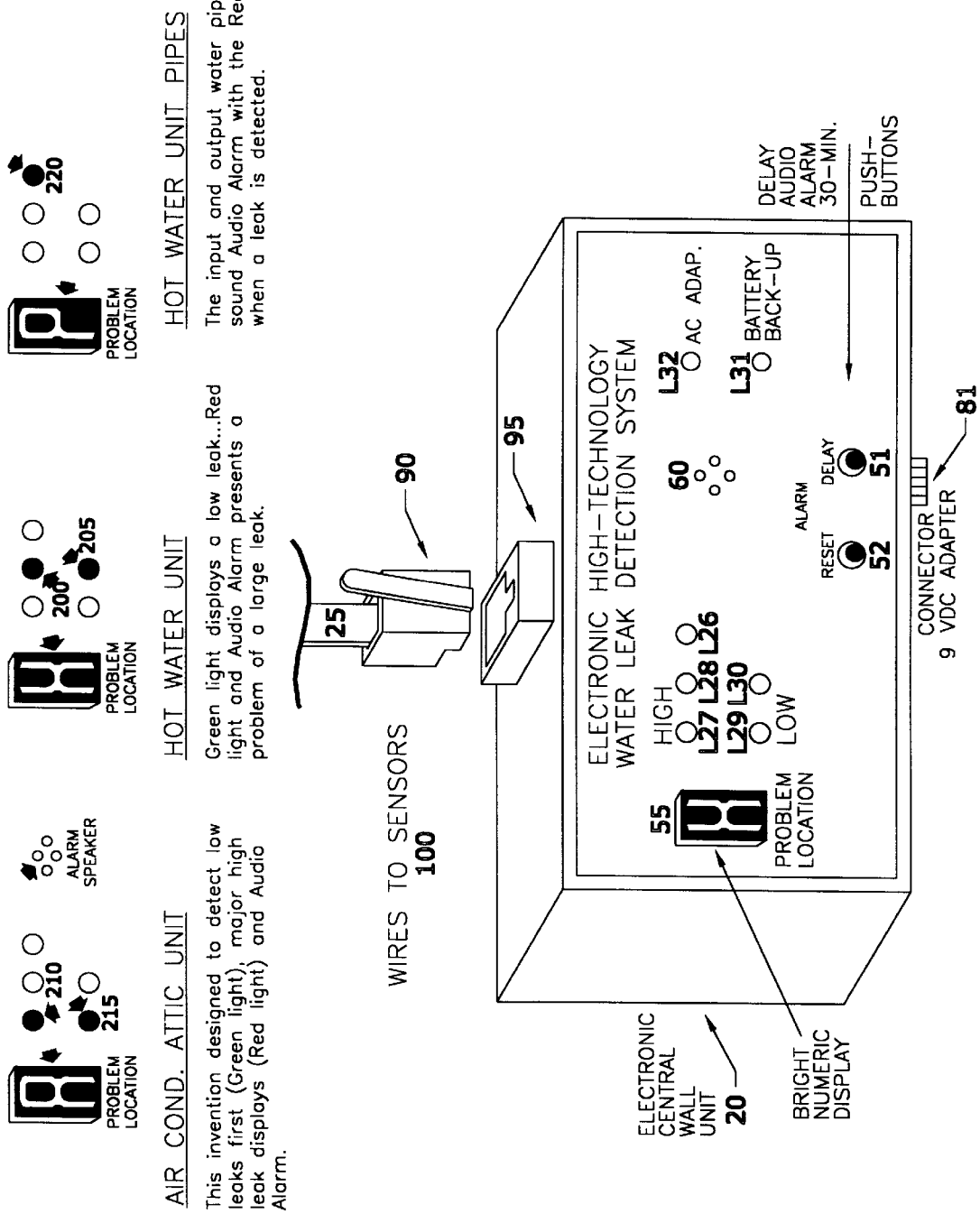

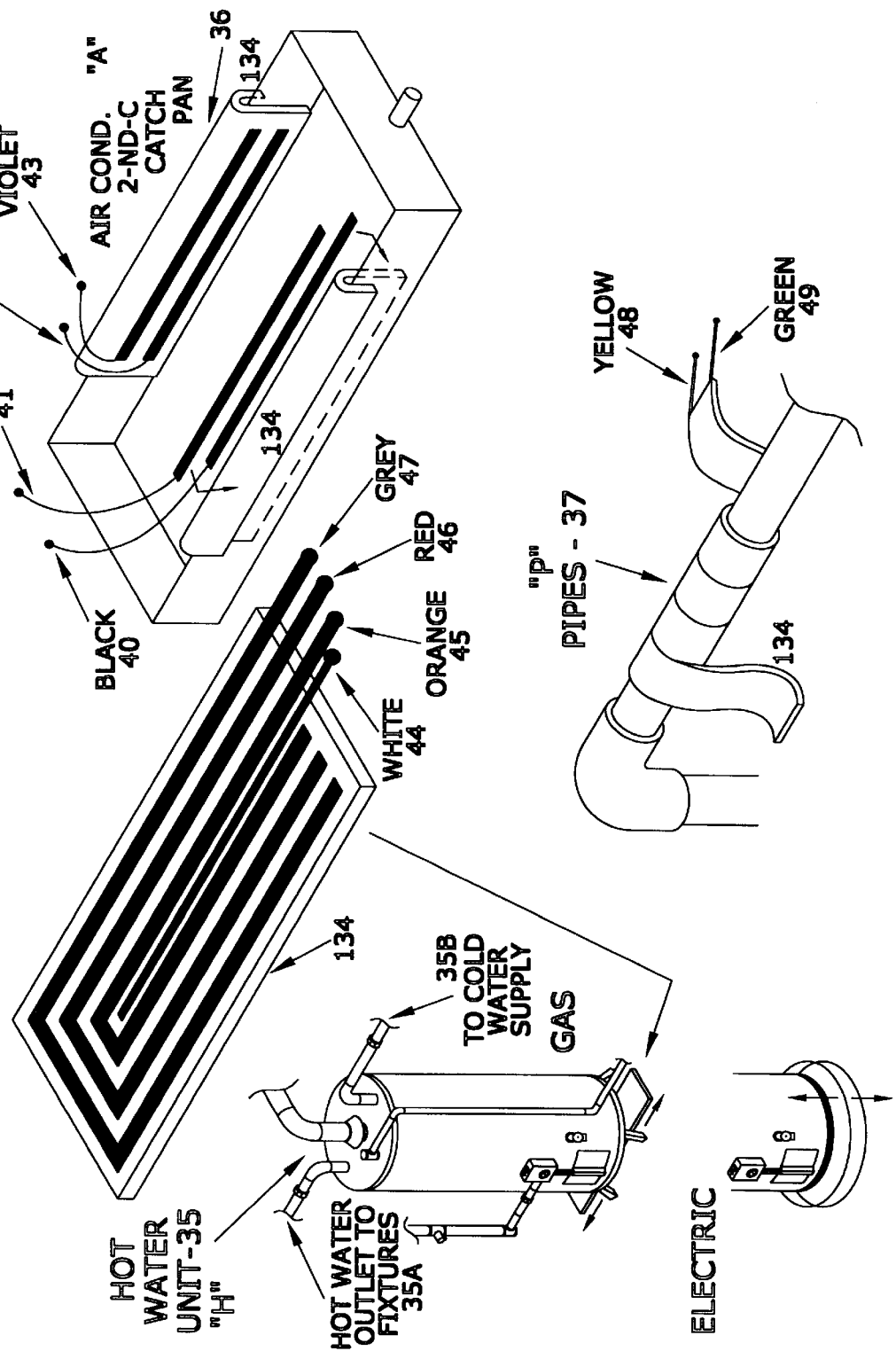

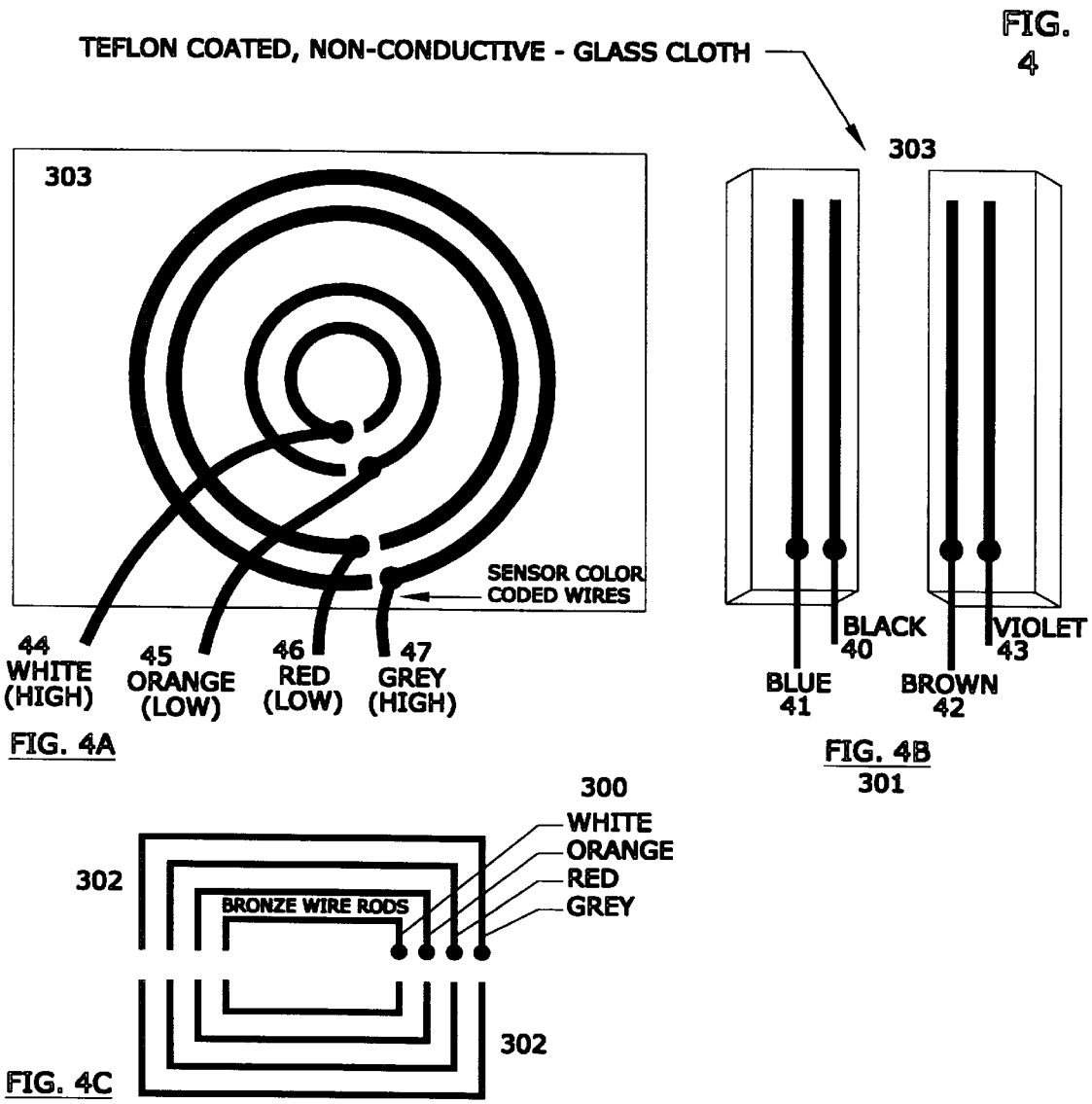

FIG. 4

A..Gas HOT Water Unit
Another sensor apparatus to detect water leaks using Teflon Coated Cloth Screened with an electrical conductive ink.

B..Air Conditioner
Depicted are sensors using self-adhesive, metal foil electrical material.

C..Electric Hot Water Unit
Another means of detecting water leaks depicting conductive metal rods used on a non-conductive floor such as wood, linoleum or other material where the water unit is located.

EARLY WARNING WATER LEAK DETECTION SYSTEM

RELATED APPLICATIONS

This application is a continuation-in-part of U.S. application Ser. No. 09/099,651 filed Jun. 18, 1998 abandoned.

BACKGROUND OF THE INVENTION

This invention relates to water leak detection, and more particularly relates to an apparatus and method for enabling early warning signaling a diversity of water leaks occurring in buildings and the like.

Water leaks are a common problem associated with air conditioners, hot water heaters, washing machines, and various other water-dependent appliances used in buildings such as homes, townhouses, apartments, mobile homes, and offices. Conventional construction patterns frequently situate air conditioners and hot water appliances in the attics of these buildings. As will be appreciated by those skilled in the art, water leaks are inherent in such water-dependent appliances. Even though most small air conditioners do not use water for refrigerant cooling, water damage is still a threat because condensate drains often foul, thereby causing overflow of the condensate catch pan.

As will also be appreciated by those skilled in the art, water leaks are typically detected only after a substantial leak or a substantial accumulation of water has developed. Obviously, it would be advantageous for practitioners in the art to have the benefit of a permanent, early-warning alarm system for detecting these common water leaks before costly repairs become necessary. Unpredictable water leaks from appliances and the like, of course, are always inconvenient and may cause incidental damage to furniture, electrical equipment, and other property. Furthermore, this problem is compounded by the prevalence of aging appliances and the like, and also aging water pipes or deteriorated joints.

Unfortunately, there is no dependable way to prevent building repairs attributable to water leaks from appliances and the like. Heretofore, only home owners and the like who have appropriate liability insurance coverage or who otherwise have sufficient financial resources, have been able to routinely cope with repairs associated with water leaks. Nonetheless, every victim of such recurring water leaks must suffer the inconvenience and disturbance to the daily routine. Furthermore, senior citizens, families living on fixed incomes, and families trying to live within low incomes not only cannot afford to have insurance coverage for predictable accidents involving water leaks and the like, but also tend to use appliances which are old and, therefore, likely to be subject to water leaks leading to major house repairs.

There have been many developments in the art seeking to detect water leaks occurring in water-related appliances and the like. For example, Barron, in U.S. Pat. No. 5,428,347, discloses a water sensor system for monitoring a plurality of water-related appliances and equipment. When leaking water is sensed, suitable action such as shutting off power or shutting off the water supply is taken. The Barron apparatus comprises a plurality of electronic circuits which include thermal circuit breakers. It will be evident to those skilled in the art that the circuitry of this apparatus is unnecessarily elaborate and interfaces directly with 120 volt and 240 volt lines. Circuit breakers in 240-volt control lines are tripped by drawing excess current to effect "memory" of leaking devices which might be hazardous if the breaker failed to trip. Leaks are detected by either opening or shorting a full-wave diode bridge. The interface with the power lines is complicated and probably would not satisfy UL safety standards. Moreover, it is a disadvantage of the Barron apparatus that standing water is prerequisite to triggering water leak detection; accordingly, water damage is apt to occur prior to alerting the consumer and the like that a problem exists.

In U.S. Pat. No. 5,229,750, Welch et al. teach a leak sensor consisting of solenoid valves for shutting off the water supply and for draining water tanks through discharge lines to the outside of a building and the like, and for simultaneously shutting off the power. The Welch sensor has a float with a metal cap, two pair of electrical probes or conductors placed on opposite sides of the float. When a water leak is detected, an inlet valve is shut and an outlet valve is opened thereby releasing stored water to the outside. As should be apparent to those skilled in the art, the water leak detection disclosed by Welch requires there being two solenoid valves for each water dependent appliance being monitored. The first solenoid valve shuts off the water being fed to the appliance, while the second solenoid valve drains the water therefrom. Thus, the operation of the Welch water leak sensor hinges upon solenoid valves being open or closed, as appropriate; it is, in actuality, a water shut-off procedure. A solenoid valve, of course, comprises a coil of wire that acts like a magnet when current is passed therethrough. That is, a solenoid is an electrically energized coil that may consist of one or more layers of windings. Using a solenoid to switch from an open to a closed position typically consists of a coil and a metal core that is free to slide along the coil axis under the influence of the magnetic field. Thus, unlike a regular valve that is a activated manually, a solenoid valve requires an electrical current for activation.

It is well known in the art that solenoid valves are not amenable to being used on any commercially available plumbing fixtures or main water supply line. Furthermore, it is not clear where practicable placement of such solenoid valves in water-dependent appliances in single-family residences, apartments and the like, industrial buildings or plants. Nevertheless, in each instances, it should be evident that retrofitting is prerequisite to Welch; it is clearly a limitation of this sensor that extensive retrofitting is required to add solenoid-actuated inlet valves and to provide valve-actuated drain paths from existing tanks and the like through exterior walls.

An example of the retrofit limitations of Welch is its application to a commode. In order to properly place the solenoid valves contemplated by Welch to turn off inlet water when a water leak is detected, the detector must be disposed in a pan. Obviously, the commode must be removed and a suitably-sized pan inserted, not to mention also inserting a toilet seat water-seal either beneath the commode or atop the pan, and perhaps another water-seal would be appropriate below the pan. Furthermore, the Welch disclosure depicts solenoid valves that have been inserted into incoming water pipes and outgoing water pipes. It is well known in the art that such solenoid valves are not normally incorporated into water pipes. Thus, the inherent retrofit aspects of Welch are clear.

Akiba, in U.S. Pat. No. 4,843,305, discloses an apparatus for sensing leaks in water pipes based upon the conductivity of spaced-apart pairs of insulated conductors which are wrapped around the pipe. More particularly, this sensor, it should be understood by those skilled in the art, however, that leaking water may not always establish contact with all exposed areas of the insulated conductors, or that leaking water may not adhere to the conductors, thereby obviously failing to signal a leak. Similar to the Akiba apparatus, in U.S. Pat. No. 4,374,379, Dennison teaches a moisture sensing apparatus for pipes that also uses a pair of spaced-apart electrical conductors partially positioned in an elongated flexible insulator which is circumferentially affixed to such pipe. The partially exposed electrical connectors are oppositely disposed relative to the pipe. An alarm actuating circuit is interconnected with the conductors and configured to initiate an alarm when water bridges the closely spaced conductors. It appears that this apparatus is insensitive to small leaks because water droplets are unable to bridge the sensing electrode gap disposed on the opposite sides of the sensor assembly.

Hinkle discloses, in U.S. Pat. No. 4,090,193, a water leak detection apparatus which used frequency multiplexing to sense the location of leaks. Sensing circuitry comprises a master indicator circuit and a plurality of satellite leak detectors for simultaneously monitoring these detectors based upon their unique frequency warning signal. The indicator circuit isolates and displays the leak location based upon the warning signal. While stating that only two wires are needed to connect all of the satellite detectors to the master, the Hinkle apparatus will require significant wiring and the like to accommodate appliance configurations prevalent in homes and buildings. Furthermore, using a speaker to announce alarm tones is impracticable because most listeners would have insufficient pitch differentiation skills to distinguish one alarm from another. It should also be evident to practitioners in the art that if tone-sensitive circuitry is used to separate alarm tones, then the economy of using a single reporting cable is apt to be lost.

A recent development in the art is a fluid leak detector disclosed by Lawson in U.S. Pat. No. 5,637,789. The Lawson device, intended for downstream leak detection in residential pipelines, detects extraneous fluid flow over a predetermined time interval by means of thermal transport using a thermistor. It appears, however, that this device suffers from being susceptible to malfunctions due to corrosion, hard water, and the like, and from being dependent upon a fine temperature differential, that, in turn, requires a high sensitivity which is inherently adversely affected by the thermistor itself. Furthermore, in order to obtain reasonable leak detection performance over a protracted period of time, the device must be calibrated from season to season. Typical of the prior art, the Lawson detector is not situated proximal to regions susceptible to having water leaks and is unable to pinpoint the actual location of such water leaks.

Accordingly, these limitations and disadvantages of the prior art are overcome with the present invention, and improved means and techniques are provided which are useful for reliably, inexpensively, and safely detecting the onset of water leaks in air conditioners, hot water appliances, pipes, etc., in a diversity of buildings and the like. The present invention prevents or at least minimizes repair damage and the like attributable to undetected or protracted water leaks.

SUMMARY OF THE INVENTION

The present invention teaches a system for early detection of water leaks in virtually any water-dependent appliance and apparatus used in buildings such as homes, townhouses, apartments, mobile homes, and offices. As will be appreciated by practitioners in the art, the present invention provides means and methods for sensing water leaks at particular locations implicating such water-dependent devices as air conditioners, hot water heaters, pipe fittings, etc., and for communicating the severity of the water-related problem. The invention is not restricted to only hot water appliances, air conditioners, or pipes, leakage from which are announced by the letters "A", "H", or "P" appearing on the face of the preferred embodiment. For example, if a home should not have a central air conditioner, the letter "A" can be used, instead of representing an air conditioner, to announce leakage from another appliance such as a dishwasher, clothes washer, or window air conditioner, in which case the "A" generally represents an "Auxiliary" appliance.

The present invention comprises a central control apparatus electrically interconnected with a plurality of circuits which enable water leaks to be accurately detected in a diversity of devices including air conditioners, compressor coils, hot water appliances, pipes, joints, etc. A plurality of water sensors are incorporated into specially designed probes of the preferred embodiment of the present invention wherein water leaks may be accurately and reliably detected in a diversity of water-dependent appliances and devices. As will be hereinafter described in detail, the preferred embodiment teaches a fiber glass cloth means that functions as a probe for sensing water leaks via its built-in plurality of sensors. This plurality of sensors constructed from a corresponding plurality of non-conductive wires enables the location and extent of a water leak to be reliably ascertained. It will also become clear that the probes are sized and designed according to the particular water-dependent appliance or appliances being monitored for leaks.

As will be described in detail, the present invention is designed to be easily installed and to be inherently devoid of any safety hazards. With the exception of the central control unit, all circuits and wiring carry electrical currents under 10 microamperes; within the central control unit, all voltages are less than 12 volts and are not referenced to "house ground," thus affording no safety hazard. Specially color-coded wires enable particular devices, appliances, and pipes to be properly and conveniently interconnected with the present invention wherein water leaks may be detected early enough to prevent consequent water-damage.

In another aspect of the present invention, there is provided a means for providing early warnings and alerts of water leaks via conventional telephone lines. Thus, the present invention teaches an inexpensive, convenient, and reliable system for detecting the location and severity of water leaks in multiple-unit living quarters and the like such as apartment complexes, townhouses, dormitories, etc., using already installed telephone equipment to communicate sensed warning signals to a distant control facility or the like so that suitable and timely remedial actions may be taken at the source of the leak.

As will be appreciated by those skilled in the art, the telephone interface taught by the present invention may be implemented with off-the-shelf conventional devices and components as will be hereinafter described in detail. This telephone interface, of course, will be invoked when enabled, typically, when an owner is not home or when a residence is unoccupied. It will be understood by those conversant in the art that having access to a remote water leak detection and warning system taught by the present invention is particularly advantageous for use in buildings that are often unoccupied such as vacation homes or storage facilities.

It is an object of the present invention to provide an apparatus for alerting consumers and the like about water leaks occurring in water-related appliances.

It is another object of the present invention to provide an apparatus for preventing damage to buildings and the like from water leaks occurring in water-related appliances and the like.

It is another object of the present invention to provide a two-tier apparatus for detecting water leaks that provides alerts about possible leaks without necessarily requiring remedial action to be taken immediately.

It is still another object of the present invention to provide an apparatus for detecting water leaks without requiring any retrofitting.

It is yet another object of the present invention to provide an apparatus for detecting water leaks without requiring any professional installation by plumbers or electricians.

It is another object of the present invention to provide an apparatus for detecting water leaks without using high voltage and current which may cause safety hazards if faults occur.

It is still another object of the present invention to provide an apparatus for detecting water leaks providing sensitivity adjustments without requiring disassembly thereof and without requiring the addition or replacement of electrical components and the like.

It is yet another object of the present invention to provide an apparatus for detecting water leaks absent false alarms caused by interference from noise, static, and the like.

It is another object of the present invention to provide an apparatus for detecting water leaks that includes a delay feature to allow a reasonable period of time for delaying an alarm condition and for taking remedial action before the alarm resumes sounding to signal that a leak is still present.

It is an object of the present invention to provide an apparatus for detecting water leaks which passively and continuously indicates that sufficient power is being provided prerequisite for proper operation of the apparatus.

It is yet another object of the present invention to provide an apparatus and method for early and reliable detection of water leaks using a plurality of sensors designed for use in conjunction with specific water-dependent devices and appliances, such as water heaters and air conditioners.

It is still another object of the present invention to provide an apparatus and method for remotely warning users by telephone of water leaks using a plurality of sensors designed for use in conjunction with specific water-dependent devices and appliances, such as water heaters and air conditioners.

These and other objects and features of the present invention will become apparent from the following detailed description, wherein reference is made to the figures in the accompanying drawings wherein like numerals refer to like components.

IN THE DRAWINGS

FIG. 2 depicts a front view of a portion of the preferred embodiment of the present invention.

FIG. 3 depicts the probe layouts and wire terminations of schematic embodiments of the present invention for hot water, air conditioning, and pipes, including wire sensor position and respective wire color codes in conjunction with fiberglass cloth.

FIG. 4A depicts an alternative embodiment of probe layouts and wire terminations for sensing water leaks in hot water units and other water related appliances, taught by the present invention.

FIG. 4B depicts an alternative embodiment of probe layouts and wire terminations for sensing water leaks in air conditioners and other water related appliances, taught by the present invention.

FIG. 4C depicts another alternative embodiment of probe layouts and wire terminations for sensing water leaks in hot water units and other water related appliances, taught by the present invention.

DETAILED DESCRIPTION

Figure 1:
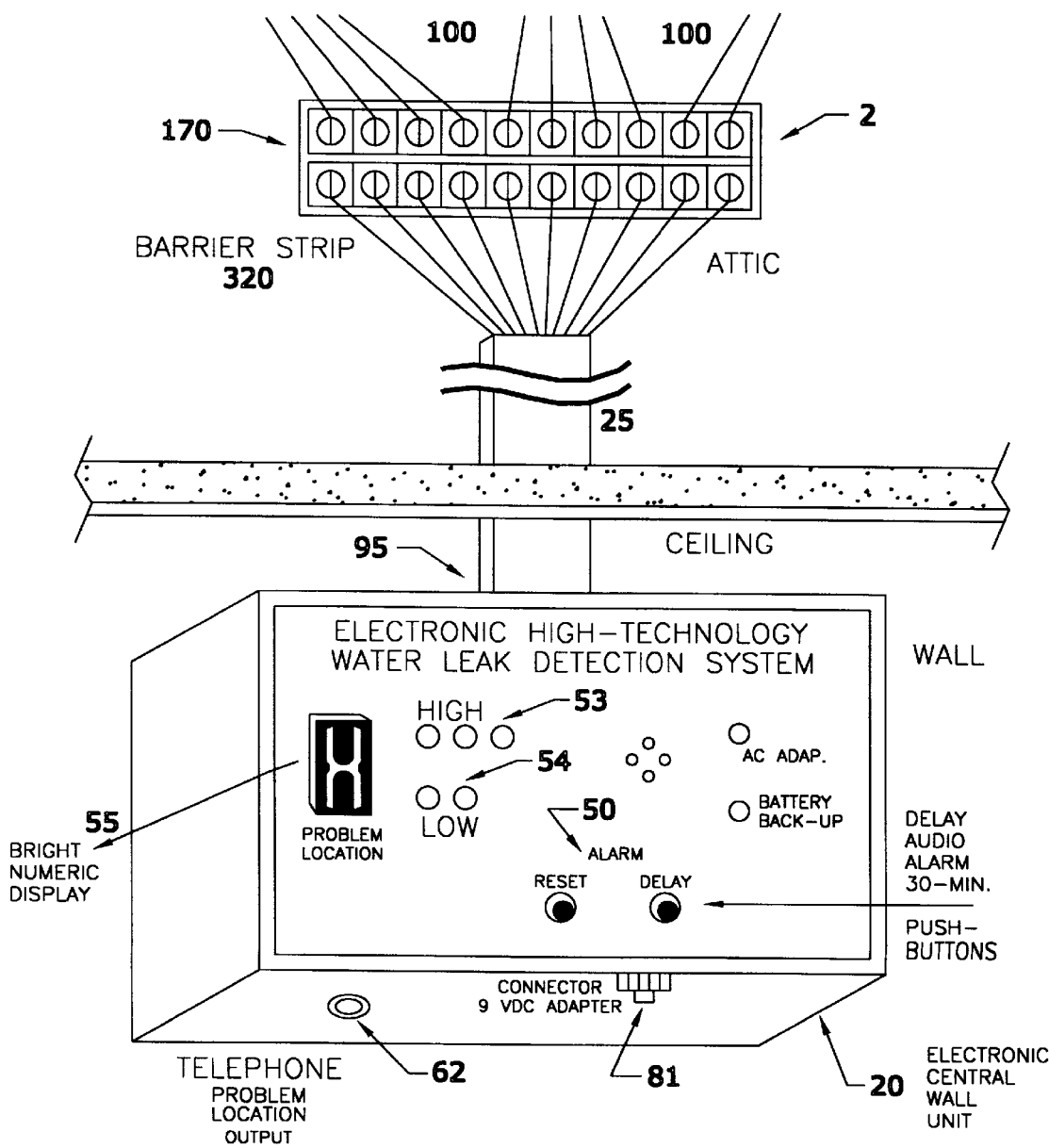
FIG. 1 depicts a simplified frontal perspective view of the preferred embodiment of the present invention in situ in a residence.

Referring now to FIG. 1, there is depicted a simplified perspective view of water leak detection system 2 contemplated by the present invention disposed in situ in a typical residence. More particularly, there is shown central control member 20 electrically interconnected with plurality of circuits 170 which cooperate with plurality of sensor wires 100 to enable water leaks to be accurately detected in water-dependent appliances such as hot water heater H and air conditioner A, and in water-carrying pipes P. Control member 20 includes a plurality of LEDs to indicate the status of water leak detection as contemplated by the present invention. Thus, there are shown plurality of LEDs 53 for indicating "high" leak conditions and plurality of LEDs 54 for indicating "low" leak conditions; window 55 displays the location of a water leak problem. Plurality of push-buttons 50 enable an alarm to be delayed or reset. Power is preferably provided from a conventional 120 volt outlet via 9v DC adapter connector 81. Telephone port means 62 enables an alarm condition to be communicated remotely over conventional telephone lines. As will be appreciated by those skilled in the art, central control unit 20 may be easily installed, preferably in a location frequented and easily accessed by homeowners, workers and the like. For example, in the home, the central control unit taught by the present invention should preferably be installed in the kitchen and preferably on a wall containing a conventional alternating current (110 volt) receptacle.

Referring now to FIG. 2, there is depicted an enlarged frontal perspective view of the displays and the like of the preferred embodiment of the present invention which serve as the interface between the user and central control member 20. LED display window 55 indicates the location where a water leak is detected: when the letter "A" is displayed, a leak is detected in air conditioner A; when the letter "H" is displayed, a leak is detected in hot water heater H; when the letter "P" is displayed, a leak is detected in pipes P. In conjunction with the letter displayed in LED window 55, plurality of lights 53—preferably red lights L28, L27, and L26—indicate that a high water leak condition is detected for air conditioner A, hot water heater H, and pipes P, respectively. Similarly, plurality of lights 54—preferably green lights L30 and L29—indicate that a low water leak condition is detected for air conditioner A and hot water heater H, respectively. Audio alarm 52 augments the signal of a major water leak in air conditioner A, wherein red light L28 is illuminated and LED window 55 displays the letter "A." Similarly, audio alarm 52 augments the signal of a major water leak in hot water heater H, wherein red light L27 is illuminated and LED window 55 displays the letter "H." Audio alarm 52 also augments the signal of a major water leak in pipes P, wherein red light L26 is illuminated and LED window 55 displays the letter "P."

As is commonly used with portable household electronic devices and the like, a 9 volt AC adapter should be used preferably with a 9 volt DC battery as a backup to power central control unit 20. Green light L32 indicates when central control member 20 is relying upon normal AC voltage for power. Red light L31 indicates when central control member 20 is relying upon backup battery for power. Thus, when LED L31 is illuminated, a loss of electricity has occurred and the backup has been activated. To maintain the integrity of the water leak detection, however, preferably audio alarm 50 should be sounded when the backup battery needs replacing. At all other times, green LED L32 indicates that AC adapter 35 is providing electrical power. Delay button 51 provides a means for delaying the sounding of alarm 50 for a prescribed length of time for remedial action to be taken as will be hereinafter described. Reset button 52 enables the sounding of alarm 50 via buzzer 60 to be discontinued after suitable remedial action has been taken.

Referring now to FIGS. 1–2, there are seen shielded housing 25 and plurality of sensor wires 100 emanating therefrom. Plurality of sensor wires 100 is interconnected with corresponding plurality of sensor means 130 disposed at end remote of housing 25 and opposite from end proximal to housing 25. According to the preferred embodiment of the present invention, a ten foot length of five pairs of different colored wires 100 are supplied with central control member 20 and are attached to spring-protected, male modular plug 90 which is inserted into receptacle 95 located atop central wall member 20. These color-coded wires 100 are connected to female insulated jack 95 contained within the central wall member 20 which attaches the proper color wires to their respective position on printed circuit board 170, as will be hereinafter described. As will be appreciated by those skilled in the art, the designated color-coded wires attached to the proper electronic component is an important aspect of the present invention, not only for detecting a leak occurring in the correct water-related appliance, but also for detecting the size of such leak.

It will be apparent that the present invention is designed to detect low water leaks in appliances initially, preferably indicated by a green light display. More severe or high water leaks are preferably indicated by a red light display. Detection of severe water leaks are signaled by an audio alarm. Water leaks in pipes, typically causing serious problems, is preferably indicated by a red light display. Referring specifically to FIG. 2, the combination of LEDs that indicate particular appliance or pipe leaks are depicted. Thus, for a water leak found in an air conditioner unit conventionally located in a residence attic, light L27 indicates a low leak condition and light L29 indicates a high leak condition. For a low leak detected in an air conditioner, window 55 would display the letter "A" and LED L29 would be illuminated, shown by numeral 215; if a high leak is detected, window 55 would display the letter "A" and LED L27 would be illuminated, shown by numeral 210. Similarly, for a low leak detected in a hot water heater, window 55 would display the letter "H" and LED L30 would be illuminated, shown by numeral 205; if a high leak is detected, window 55 would display the letter "H" and LED L28 would be illuminated, shown by numeral 200. For a leak detected in water pipes, window 55 would display the letter "P" and LED L26 would be illuminated, shown by numeral 220.

Referring to FIGS. 3 and 4 A, B, and C, there are shown probe layouts and wire terminations of embodiments of the present invention configured for detecting water leaks in hot water heaters, in air conditioning units, and in pipes, including wire sensor position and respective wire color codes in conjunction with suitable plurality of probe means 130. More particularly, each probe means 134 of plurality of probe means 130 contemplated under the present invention is preferably constructed to withstand heat and temperatures common in applications under or near hot water units or pipes. The design of the preferably flexible probes used depends upon the type of appliances, their sizes, and location of the units as illustrated in FIG. 3, namely, hot water heater 35, air conditioner 36, pipes 37.

As will be herein described in detail, an arrangement of plurality of sensors 134 is encased within the probe means of the preferred embodiment, identified by numeral 303. This probe 303 preferably comprises a fiberglass cloth that affords an excellent base in conjunction with plurality of bronze wire metal rods 302 or other conductive material to detect water leaks as will be appreciated by those skilled in the art. Probe means 303 should preferably comprise a high temperature heat resistant insulated Teflon-coated glass cloth which is non-conductive, and required to accommodate the plurality of sensors depicted in FIGS. 3–4 A, B, and C. As will become apparent to those skilled in the art, such sensor probes taught by the present invention are designed to be applicable in various water bearing appliances. These water-leak sensors, depending upon the demands of a diversity of applications, may be constructed from non-shielded wire, metal rods, silk-screened designs utilizing an electrically conductive ink, and adhesive backed aluminum strips.

Now referring specifically to FIG. 3, there is shown probe layout and color coding therefor under the preferred embodiment. It will be appreciated by those skilled in the art that each water sensor means contemplated by the present invention comprises a set of paired metal rods that create a conduction path when water appears therebetween. As will be hereinafter described in detail, the plurality of sensor means 130 taught by the present invention is connected to circuit board means 170 by multiconductor cable means 100 (see FIG. 8). The preferred embodiment herein described employs five sensors, two each for hi and lo alarms from two appliances and one for pipe leaks. Other embodiments would be constructed with more or fewer sensors depending on the number of appliances and/or locations to be monitored.

The preferable water probe layout 134 for detecting water leaks in hot water unit 35 ("H") having conventional cold water supply 35b and hot water outlet to fixtures 35a are clearly shown. The sensor assembly 134 comprising probe 303 taught by the present invention is shown disposed underneath hot water heater 35. Gray wire 47 and white wire 44 are integral to the signaling of a high (H-High) leak condition and red wire 46 and orange wire 45 are integral to the signaling of a low (H-Low) hot water heater water leak condition.

Similarly, the water probe layout of sensors taught by the present invention is shown for detecting water leaks in air conditioner unit and associated catch pan 36 ("A") that are typically located in an attic. Blue wire 41 and violet wire 43 are integral to the signaling of a high (AC-High) leak condition and black wire 40 and brown wire 42 signal a low (AC-Low) air conditioner water leak condition. The preferred water probe layout for detecting water leaks in pipes 37 ("P") is also shown. Green wire 49 and yellow wire 48 are integral to the signaling of a water leak condition in pipes P. As will be understood by those skilled in the art, the set of AC-High, AC-Low, HW-High, HW-Low, and Pipes constitute the plurality of moisture probes taught by the preferred embodiment of the present invention, Indeed, as will be described in detail, the novel circuitry taught by the present invention receives inputs from each of this plurality of moisture probes for signaling water leaks as they occur.

Those skilled in the art will readily understand the novelty of the probes and encased water sensors by referring specifically to FIG. 3 wherein is illustrated the various positions of non-shielded conductive wires and/or small rods inserted within the flexible fiberglass cloth taught by the present invention. This fiberglass cloth, containing no asbestos, preferably withstands temperatures up to 1,000° F. on a continuous basis while providing adequate abrasion and strength characteristics. It preferably consists of 100 percent woven texturized fiberglass, that is designed and woven to absorb water, to performing the sensitive water-detection functions taught herein. It has been found to be advantageous to provide sensors that afford the ability to withstand high temperatures over a long period of time. Besides promoting longevity of the early-warning water leak detection system contemplated by the present invention, it tends to eliminate a scorching appearance on the wood or other type of floor normally found under gas related appliances or the like. Many appliance manufacturers and plumbing codes, indeed, prohibit any combustible or flammable material to be placed under gas related appliances and the like. As shown in FIG. 3, the size of fiberglass cloth 303, functionally referred to as a "probe," contains the location and positions of the plurality of conductive wires, functionally referred to as "sensors." It will be clear to those conversant in the art that the particular size and design of the probes will preferably vary depending upon the size or type of the water-related appliance being monitored for water leaks.

On each end and both sides of these fiberglass probes, preferably a special silicone cloth, capable of withstanding high temperatures up to 2300° F., is fixedly attached preferably using high-temperature sewing thread. It will be appreciated that this silicone cloth insulates the wire connectors that are used to attach the plurality of sensors to the color coded wires from high temperatures.

The positioning of these sensors enclosed within the fiberglass cloth probes is designed to detect water leaks, initially, of course, only being a minor problem, and will continue until the water leak becomes a major problem, if the water leak is not promptly remedied, It is evident that if the early warning of the present invention is not timely acted upon, then the underlying water leak is apt to cause significant damage to a residence, building, etc. Thus, as illustrated in FIG. 3, for hot water appliance 35, the first sensor 47 on the right and left hand side is preferably labeled or identified with the color grey. The next sensor 46 is preferably labeled red, and positioned closest to grey sensor 47. Orange sensor 45, preferably is configured with a wider space, compared to the distance between grey sensor 47 and red sensor 46. It is also seen that the same distance as red sensor 46 and orange sensor 45 is white sensor 44, positioned medially of the probe.

It will be appreciated that the present invention, unlike the prior art, provides a plurality of sensor means which are designed to reliably and accurately signal the presence of water leaks in the most vulnerable failure points in plumbing systems and the like. As will be hereinafter described, the present invention teaches a plurality of separate or specialty sensor designs for each typical water-dependent appliance—air conditioners, hot water heaters, pipes, and the like.

The plurality of particular sensor designs of the preferred embodiment are clearly depicted in FIGS. 3 and 4 A, B, C, wherein the configuration of the electrical conductive material preferably incorporated therein is shown as a function of the type of water-dependent unit and its applications. Thus, FIG. 4A depicts an isolated top view of the preferable configuration of plurality of sensor wires 44, 45, 46, and 47 electrically interconnected with Teflon-coated fiberglass cloth means 303 which have been found to detect water leaks in gas hot water heaters 35 in a manner and reliability heretofore unknown in the art. Under an embodiment of the present invention, the hot water heater water-leak probe means may be screened with an electrically conductive ink means. In FIG. 4B there is depicted an isolated top view of preferable configuration of plurality of sensor wires 40, 41, 42, and 43 probe means 303 applicable for air conditioners 36. Similarly, FIG. 4C depicts an isolated top view of the preferable configuration of plurality of bronze wire rod means 302 used on a non-conductive floor and the like constructed from wood, linoleum, and the like upon which the water-dependent appliance is disposed.

Figure 7:
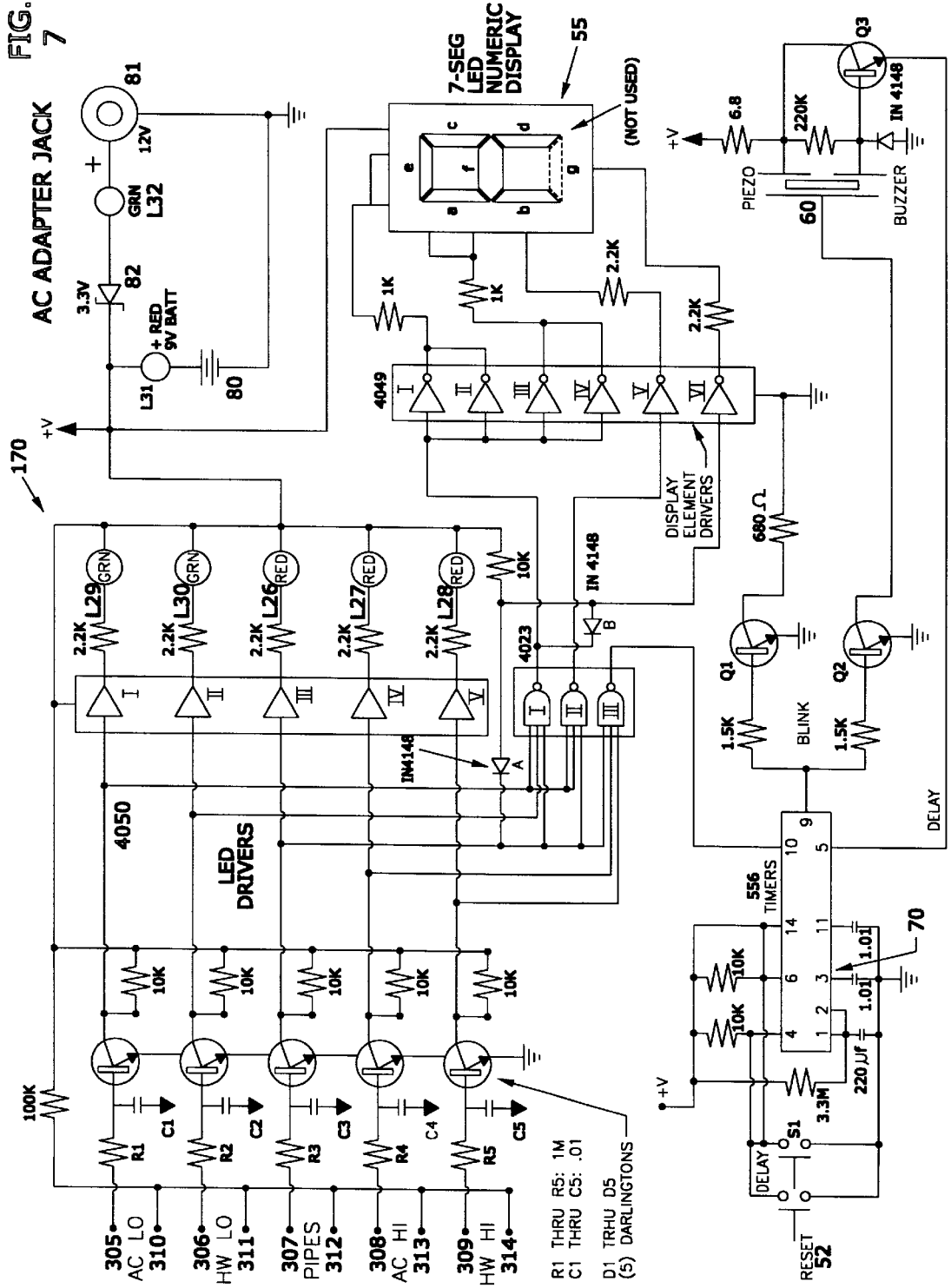
FIG. 7 depicts a circuit diagram of the preferred embodiment of a central control station of the present invention.
Figure 8:
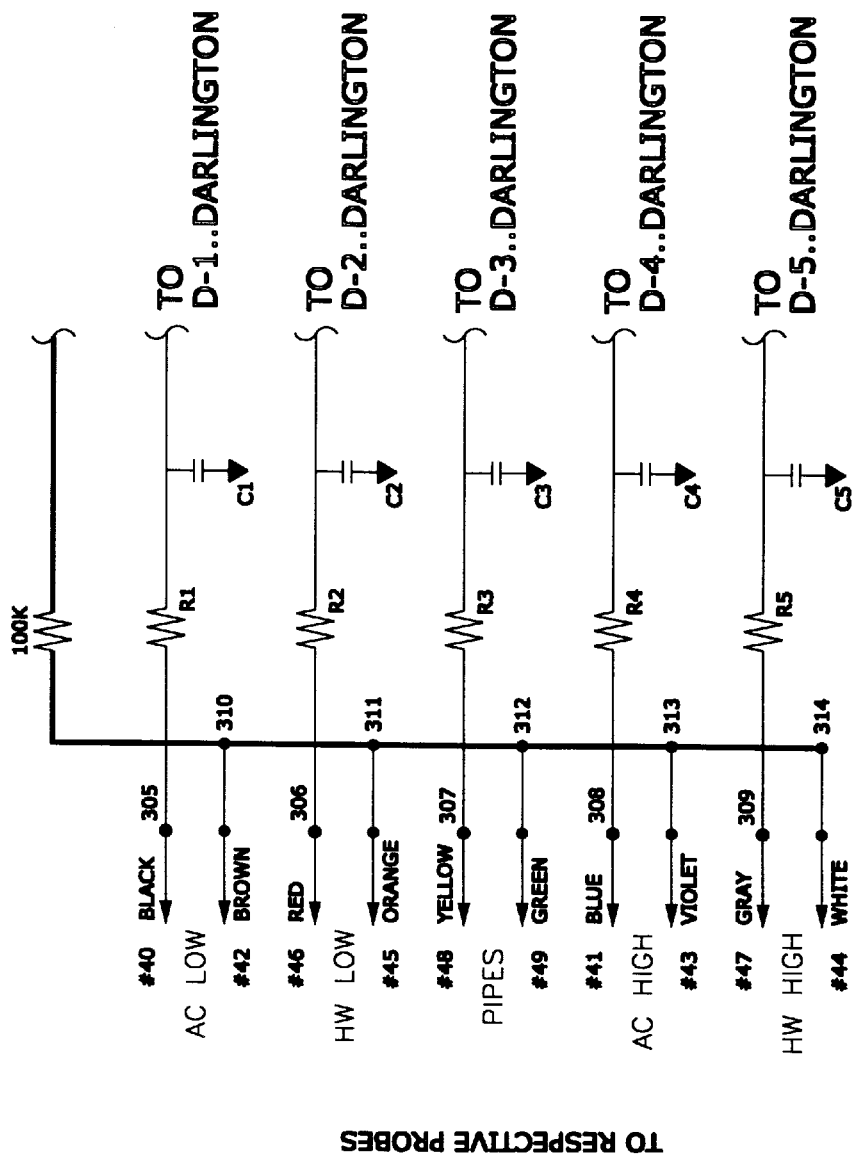
FIG. 8 depicts a circuit diagram embodying the color-coded wires and connections of the present invention.

According to the present invention, when water leaks are detected by a plurality of sensor means, an electrical signal is input to circuit 170 depicted in FIGS. 7 and 8. Plurality of preferably high-impedance Darlington circuits D-1, D-2, D-3, D-4 and D-5, respectively, accept inputs preferably from five moisture probe means as hereinbefore described corresponding to hot water heater "hi" 200 ( abbreviated as "HW hi"), hot water heater "low" 205 (abbreviated as "HW lo"), air conditioning "high" 210 (abbreviated as "AC hi"), air conditioning "low" 215 (abbreviated as "AC lo"), and pipes 220. For example, a plurality of Darlington circuits contemplated by the present invention is Zetex model ZTX601. It will be appreciated by those skilled in the art that this plurality of Darlington circuits should preferably be protected by plurality of high value resistors R1–R5, e.g., 1 megohm resistors, and corresponding plurality of shunt capacitors C1–C5, e.g., 0.01 μfd capacitors, to prevent static electricity or other charges on the sensor lines from causing damage to the circuitry contemplated by the present invention.

It will be understood by those skilled in the art that a sensor amplifier based on the Darlington configuration taught by the present invention provides a high gain in excess of 20000 to achieve high sensitivity to small amounts of moisture corresponding to very low conductivity, on the order of 1 micromho. Since, under the teachings of the present invention, such an amplifier is preferably used for each sensor input, the source of an alarm may be readily and accurately identified.

According to the preferred embodiment, five sensors are provided for monitoring three different physical locations, two of which indicate early warning of small, initial water leaks. Unlike the prior art, this inherent early warning feature avoids serious water leakage problems or enables such serious problems to be avoided, provided that remedial action is timely taken. As will be appreciated by those skilled in the art, moisture manifesting leakage occurring in the proximity of a hot water heater, an air conditioner, or water pipes causes the corresponding circuit of plurality of Darlington circuit means D-1, D-2, D-3, D-4 and D-5 to conduct electricity and, via plurality of LED drivers I—V, to light their corresponding green LEDs L29 and L30, or red LEDs L26, L27 and L28, and to simultaneously indicate the problem source on preferably seven-segment LED alpha display 55.

Referring now to FIGS. 2 and 7, under the present invention, whenever an alarm condition occurs, a combination of plurality of alphanumeric display segment means a, b, c, d, e, f, and g are illuminated to produce the appropriate image in display window 55 as hereinbefore described. For example, when either AC lo 215, HW lo 205, or Pipes 220 is alarmed, alphanumeric display segments a, b, c, and f are illuminated; which is implemented by 3-OR circuit I and display element driver amplifiers I, II, II, and IV. OR circuits I, II, and III are implemented by CMOS integrated circuit triple three-input NAND gates designated as type 4023 operating under the principles of DeMorgan's theorem. As will be understood by those skilled in the art, this may also be implemented by many other similar circuits such as the 7410 circuit in TTL series devices. The circuit choice depicted in FIG. 7 is not meant to be limiting but merely an illustrative embodiment of the present invention. Similarly, CMOS circuit type 4049 implements the inverting display-element drivers I—VI, but many other devices could be substituted in the circuit to achieve the intended result. This, of course, also holds for CMOS circuit type 4050 that implements the non-inverting LED drivers I—V.

Similarly, when either AC lo 215 or HW lo 205 is alarmed, the corresponding green LED is illuminated from the Darlington output. When either AC lo 215 or Pipes 220 is alarmed, alphanumeric display segment e is illuminated; which is implemented by the 3-OR circuit II and display element driver amplifier V. When either AC lo 215 or HW lo 205 is alarmed and Pipes 220 is not alarmed, alphanumeric display segment means d is illuminated, which is implemented by the 2-OR circuit formed by diodes A and B and display element driver amplifier VI. If, however, Pipes 220 is alarmed, then this 2-OR circuit prevents display segment d from being illuminated because a pipe alarm should override an AC or HW alarm. As shown in FIG. 7, in the preferred embodiment, alphanumeric display segment g is not used.

The present invention teaches that when either AC hi 210, HW hi 200, or Pipes 220 is alarmed, the output of 3-OR circuit III causes buzzer Q2 to sound. The buzzer may be temporarily silenced by pressing delay push-button 51 allowing ample time for remedial action to be taken. When the water leakage problem is resolved, the reset push-button 52 is used to silence buzzer 60 by returning the alarm circuit comprised of dual timers 70, Q1, Q2, Q3 and the plurality of supporting resistive and capacitive components to a normal state. Resetting may also be used, of course, if the buzzer sounds inadvertently when the system is initially powered. The 30-minute delay and 1-second blink timers incorporated into the preferred embodiment are contained in dual-timer circuit 70. Q1 causes alphanumeric display 55 to brighten at the blink rate; Q2 causes buzzer interruptions at the blink rate; Q3 is the buzzer driver and prevents the buzzer from sounding if the 30-minute delay period is invoked.

Under the present invention, power is derived preferably from the AC mains by use of a UL-approved wall-transformer adapter. If the derived DC voltage is higher than that from a 9-volt back-up battery and the like, the battery will be disconnected from the load via the LEDs used to indicate which source is active. As will be understood by those skilled in the art, since a LED is fundamentally a diode, an AC/battery LED pair may be used as an OR-circuit. Assuming that the adapter provides 12 volts when active, red battery LED L31 is back-biased and disconnects the 9-volt battery 80 from the load. Contrariwise, when the AC power fails, the green mains LED L32 is back-biased and prevents the battery current from flowing into the adapter connected to the circuit by means of jack 81.

As will be appreciated by those skilled in the art, when the water detection methodology taught by the present invention is being driven by battery-backup, 3-volt Zener diode 82 equalizes the adapter voltage to be commensurate with the voltage of the 9-volt battery. Assuming that indicator LED L31 has a 1-volt drop, the net voltage delivered by battery 80 is 8 volts and, correspondingly, the net adapter voltage is also 8 volts. Accordingly, the AC-powered LEDs and alarms will not appear brighter and louder, respectively, than like battery-powered LEDs and alarms. It will be appreciated that 12 volts is a standard adapter voltage that is typically next-higher than the 9-volt backup battery that is provided with the preferred embodiment of the present invention. Thus, such a judicious selection of alternative power supply avoids the necessity for using a relay to maintain operation during AC mains failures.

As will be clearly understood by those skilled in the art, the present invention has been designed to minimize exposure to electrical shocks and the like, whereby minimal electrical current is the rule throughout. The only exception to this minimum-current rule is the central control unit taught by the present invention in which, nevertheless, only non-hazardous voltages are present. As will be appreciated by practitioners in the art, only a screw-driver is required for installation of the water detection system disclosed herein. Indeed, wiring is easily accomplished using the color-coding scheme herein described in detail.

The sensor terminal voltages of the preferred embodiment of the present invention were tested by using a wall adapter to develop a larger supply voltage than would be obtained by using a 9-volt battery. The adapter voltage with the circuit attached was 11.9 volts and the voltage available on the circuit board after passing through the green power-indicator LED was 9.9 volts. Under these test conditions, the open circuit (OC) voltage among the sensor terminals varied from 6.5 to 7.5 volts when measured using a high-impedance voltmeter. It will be appreciated that a standard analog voltmeter having 20,000 ohms/volt sensitivity cannot be used; the OC voltage will appear to drop to 0.35 volt because of the high source impedance of the sensor input circuitry. The short circuit current is between 7 and 8 microamperes at any of the five sensor input terminals. With a one meg ohm load the terminal voltage is 2.9 volts. When the terminal leads are immersed in clear water and separated by one inch, the voltage drops to 0.6 volt.

According to the teachings of the present invention, a design change can reduce these measured values even further. The sensor common terminal is returned to the supply through a 100 K-ohm resistor. If a voltage divider is created by adding a 220 K-ohm resistor to ground at the common terminal, the OC voltage becomes 0.6 volt, the short-circuit current is less than 1 microampere, and the voltage in clear water is 0.12 volt. The total source impedance at each sensor terminal-pair is about 1 meg ohm. If it is assumed that the sensitivity decreases in direct proportion as cabling resistance is added to this impedance, the sensitivity will decrease slightly as a function of the cable loop distance (twice the cable run to account for resistance of both wires of the pair attached to a sensor). Hence, one mile of 26-gauge cable will decrease the sensitivity by less than 0.1 percent, using published values for telephone cable at near DC conditions of 433 ohms per loop mile.

The inherent advantages of the present invention will be appreciated by those knowledgeable in the art. In particular, the design taught by the present invention provides sensors which accurately detect water leaks at the most vulnerable points of failure in plumbing systems and the like.

It will thus be understood by those skilled in the art that another feature and advantage of the preferred embodiment of the present invention is to provide a means and method for situating a unique water leak detection apparatus using approximately ten feet of multiple conductor cable intended for interconnection with a branch point under the installer's discretion regarding the optimal routing off the cable for each of the plurality of sensors so that all electrical code requirements are satisfied.

For humidity compensation, in many regions sensors other than those used for hot-water heaters may be subject to high-humidity environments. Prolonged exposure to 90% relative humidity air will cause the inter-electrode resistance to fall below 10 megohms and cause the corresponding plurality of Darlington amplifier means (D1–D5 in FIG. 7) to conduct and indicate a low or high alarm condition. Under the present invention, this problem is rectified by adding resistive-divider circuits that reduce the voltage at the gates of the Darlington amplifiers. The divider is implemented by connecting a resistor from the Darlington gate to ground. The resistor value depends on the sensor attached to the input port (AC lo & hi, HW lo & hi, Pipes) as the humidity induced resistance depends on the electrode spacing within the sensor. Typically, the additional resistors have values in the 1 to 3 megohm range.

FIG. 8 shows a schematic diagram of the connections to the schematic of the circuit board depicted in FIG. 7, wherein the particular connections of the plurality of color-coded sensor wires comprising the preferred embodiment of the present invention are shown. For the AC Lo condition, black wire 40 and brown wire 42 are interconnected with Darlington circuit D-1 at 305 and 310, respectively. For the HW Lo condition, red wire 46 and orange wire 45 are interconnected with Darlington circuit D-2 at 306 and 311. For the Pipes condition, yellow wire 48 and green wire 49 are interconnected with Darlington circuit D-3 at 307 and 312. For the AC Hi condition, blue wire 41 and violet wire 43 are interconnected with Darlington circuit D-4 at 308 and 313, respectively. For the HW Hi condition, gray wire 47 and white wire 44 are interconnected with Darlington circuit D-5 at 309 and 314.

It will be appreciated by those skilled in the art that, in order to derive the maximum utility of the probes taught by the present invention, it is important to properly position the sensors so that early detection of water leaks may occur. As clearly shown in FIG. 8, water leak must bridge two sensors, one connected to a Darlington Transistor and the other not connected to a Darlington Transistor. As an example, should a leak first develop in hot water appliance 35, due to the specially woven, water absorbing, fiberglass probe and positioning of the sensors, in the event the water leak bridging grey sensor 47 and red sensor 46, no leak will be detected. This has been found to occur because grey sensor 47 is preferably located on the outer edge of the probes, and, within moments, water will bridge red sensor 46, orange sensor 45, and/or white sensor 44 first. As has been hereinbefore described, this causes display 55 of the letter"H" on 7-segment LED numeric display and displaying green LED L30 on the electronic central wall unit (see FIG. 2). As the leak continues and bridges grey sensor 47, orange sensor 45, and/or white sensor 44, then red LED (light emitting diode) L28 will be brightly displayed and the audio alarm will preferably sound indicating a major water leak problem.

Another example of the functionality of the present invention is its probes located in the secondary catch pan under an air conditioner condenser coil. As will be comprehended by those skilled in the art, two probes are used to detect a water leak. An air conditioner is not actually a water-related appliance, but condensation produces water that is caused to fall into the catch pan. This catch pan contains a drainage pipe so that excess condensed water may be drained to the outside of the building. This water, typically during a protracted period of time, produces a gel that ultimately clogs the drainage pipe. Unfortunately, occupants of air conditioned buildings and the like have solely relied upon the appearance of the water damage before this clogging problem could be detected.

The present invention eliminates this infirmity of the prior art. As will be appreciated by knowledgeable practitioners, the water leak detection system disclosed herein uses two fiberglass probes containing two sensors each placed on each side of the air conditioner catch pan. The fiberglass probes are preferably positioned just above the drainage pipe. The probe located on the right side contains two sensors, with the lower sensor being brown sensor 42 and violet sensor 43 disposed thereabove. The probe located on the left side is black sensor 40 connected to a corresponding Darlington Transistor, and upper blue sensor 41 also connected to a corresponding Darlington Transistor. Should the water pipe become clogged and the water begin to accumulate in the catch pan, the water will bridge black sensor 40 and brown sensor 42, effectuating display A55 of an "A" on 7-segment LED and green LED L29 will be brightly displayed to designate a low leak problem. Of course, if the water leak situation is not timely corrected by uncloging the drainage pipe, the water will continue to rise and, before overflowing, the catch pan will bridge blue sensor 41 and violet sensor 43, thereby lighting the red LED and simultaneously sounding an audio alarm on the electronic central wall unit. Ergo, the present invention teaches both an early-warning methodology for preventing significant water leaks from occurring and a fail-safe methodology for preventing substantial water-damage from occurring from overflows and the like. Pipe probes 37 use two sensors, green sensor 49 and yellow sensor 48 for designating a high only corresponding to when a water leak is detected and concomitantly displayed on red LED L26 plus the audio alarm. It will be understood that other probes suitable for a diversity of water-related appliances will function as herein described in detail.

Figure 5:
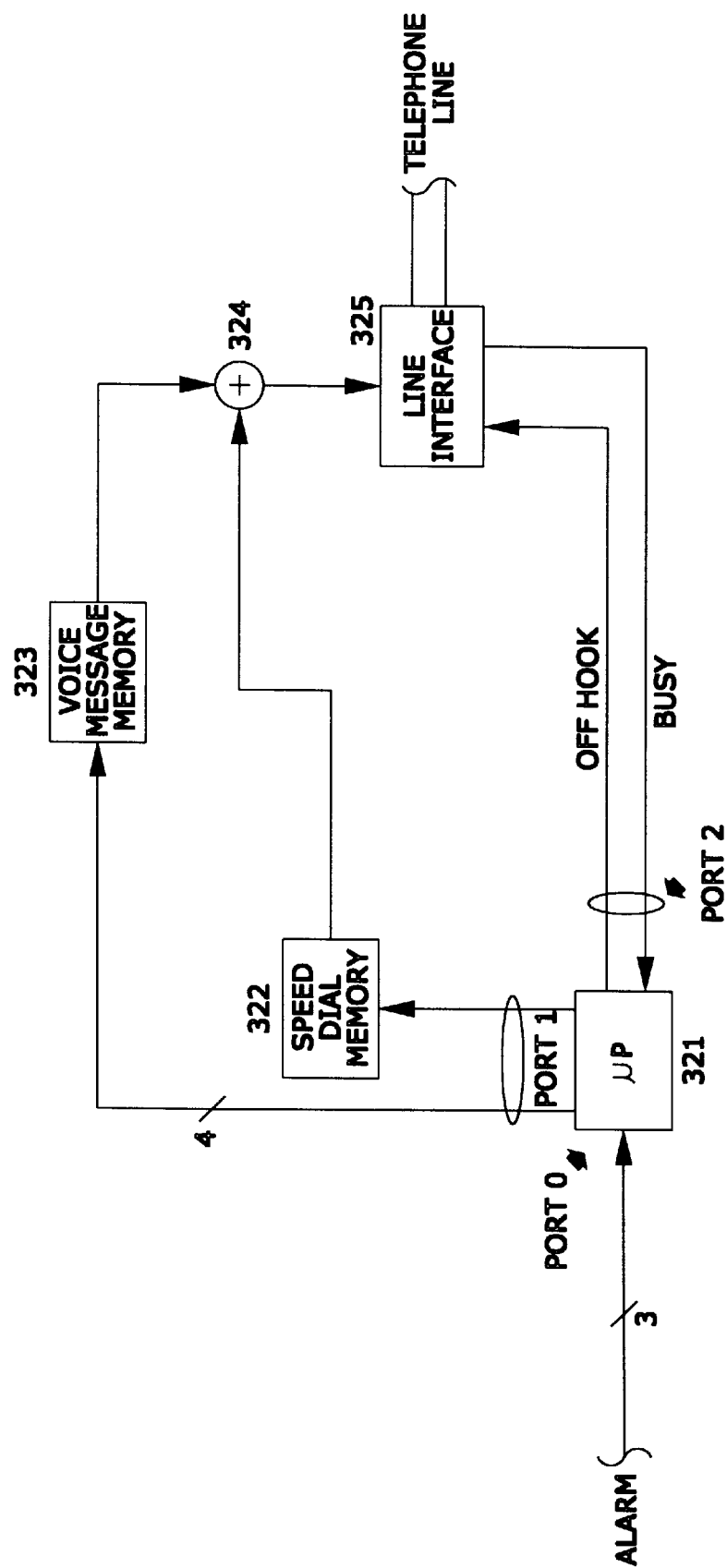
FIG. 5 depicts a simplified block diagram of a telephone interface embodying the present invention.
Figure 6:
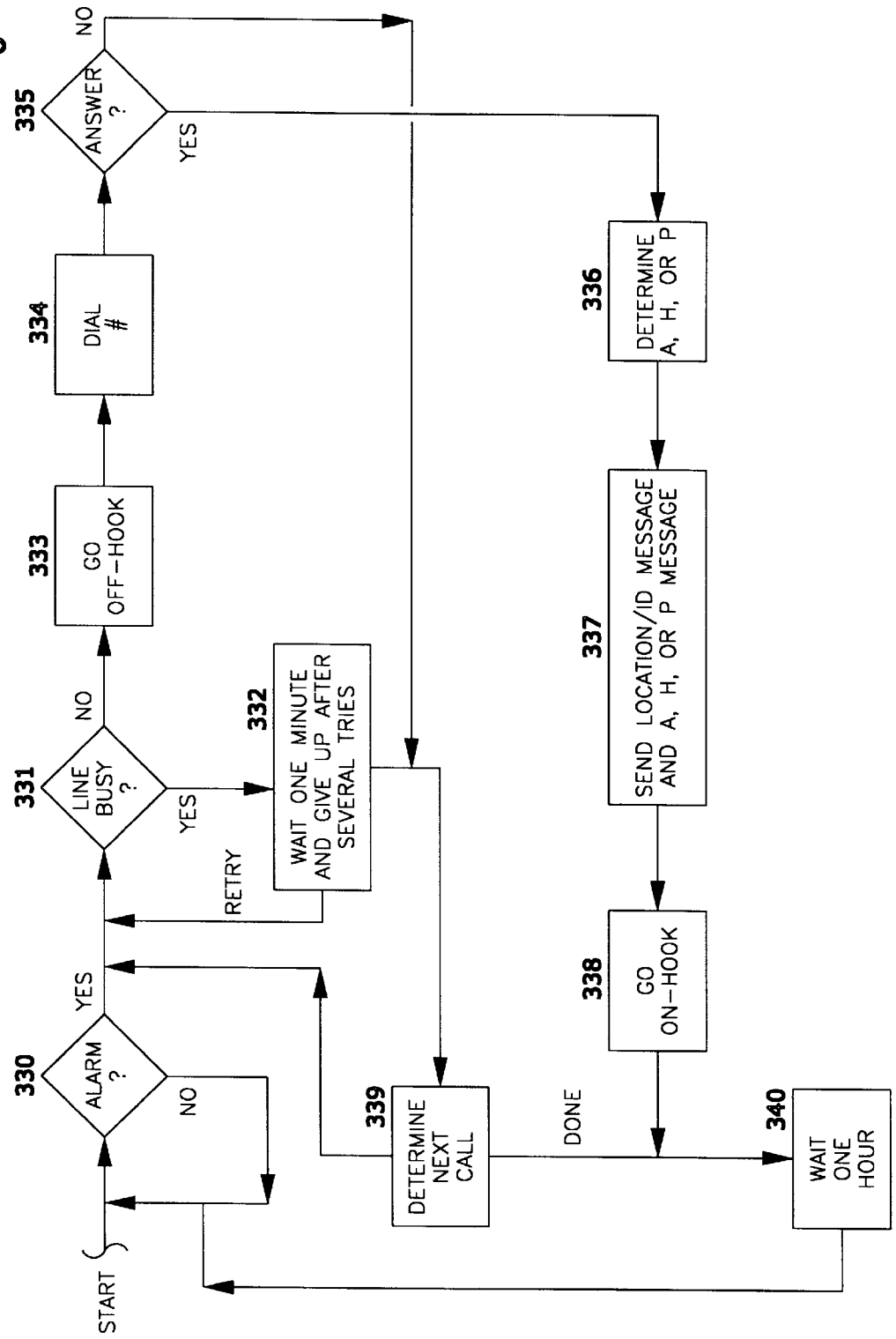
FIG. 6 depicts a flow diagram of the telephone interface embodying the present invention depicted in FIG. 5.

Now referring to FIGS. 5 and 6, the telephone interface taught by the present invention is shown. Contemplated as easily being implemented with off-the-shelf conventional devices and components, telephone interface 320 taught by the present invention, of course, will be invoked when enabled, typically, when an owner is not home or when a residence or other building is unoccupied. As shown in FIG. 1, the water problem location is communicated to telephone interface 320 through telephone output port 62. It will be understood by those conversant in the art that having access to a remote water leak detection and warning system taught by the present invention is particularly advantageous for use in buildings that are usually unoccupied such as vacation homes or storage facilities.

The interface to the water leak detection system hereinbefore described in detail preferably consists of four wires; three wires are for connections to the three Hi alarms (Pipes, HW and AC) and the fourth wire is a return wire for the other three. As shown in FIG. 5, the three alarms are sensed by a microprocessor ($\mu$P), 321. For example, the 8051 series affords a suitable microprocessor, wherein the alarms may enter via port zero and the circuits controlled by the $\mu$P may leave via ports 1 and 2. It will be understood that the 8051 provides four bi-directional data ports; port 3 can be used directly for serial data by means of an internal UART if needed in future expansions of the interface functions. The 8051 also contains two internal timers that are used for the "wait" functions shown in FIG. 6.

According to the present invention, if an alarm occurs, $\mu$P 321 determines whether the alarm is attributable to HW, AC, or Pipes by virtue of the order in which the three alarm lines are connected to port 0 of $\mu$P 336 (see FIG. 6). The $\mu$P then determines if the line is free or busy 331 and then dials 334 the first and subsequent telephone numbers that the user decides should be called 339. A speed-dial device may, of course, be used to implement dialing function 322. A representative speed dial device is the Philips PCD3332 or the Austria Mikro Systeme's AS2531 device having sufficient memory to hold a repertory of fourteen telephone numbers. When a call is completed 335 a stored message identifying the caller's location is sent 337; after this a message is sent saying that either the HW, AC, or Pipes are leaking. According to the present invention, the time that the alarm occurred can also be sent since the $\mu$P can maintain time and date information.

It will be appreciated that the leak messages contemplated by the present invention are standard and can be mass-produced as low-cost ROM internal to voice storage device 323. The location message is either "cut" for each location, or can be sequential serial numbers that are referenced to subscriber locations in each service area, if a centralized monitoring service is used. Stored message memory 323 is available from several sources including Eletech and ISD, both of whose devices can store a number of messages, depending on their lengths.

In a manner known in the art, the speed-dial output is combined with the voice message output by means of summing resistors or an op-amp 324. This combined output is sent to a line interface device 325 such as the Xecom XE0002B device that is FCC Part 68 approved for connection to the PSTN. If the line interface indicates that the called party's phone is busy 331, the $\mu$P will wait for a minute and try again if the system alarm is still active 332. Since a typical speed-dialer can hold ten or more telephone numbers, the present invention may be programmed to dial several parties in a priority sequence to assure that there will be at least one response to alarm 339.

It will be appreciated that FIG. 6 depicts the flow or succession of actions herein described relative to the $\mu$P's computer program; as is well known in the art, it is preferable to store the instructions manifest as this computer program as firmware. The $\mu$P is constantly waiting for alarm 330. When an alarm 330 occurs the telephone line is checked for busy 331. If busy, a one-minute wait 332 occurs and the line is retried several times before giving up and another number is tried 339. If available, the first number stored in the speed-dial memory 334 is dialed. If the called number 335 answers, then an appropriate message is sent including type of device leaking 336 and location or identification information stored in a voice-answer memory 337. If the called number does not answer, the next number 339 (if any) is dialed by means of the same procedure. After either a dialed number answers, or all stored number to call have been dialed without answering, a one-hour wait occurs 340 and, if the alarm is still active, these steps are repeated.

Under the present invention, after a water leak alarm has been signaled, it is contemplated that a reasonable period of delay should be preset for a user taking appropriate remedial action to alleviate the discovered water leak condition and to cease indicating the leak. Once this period of delay— preferably thirty minutes—has transpired, then the alarm either ceases because the water leak has been remedied, or resumes because the water leak persists. It should be evident to those skilled in the art that thirty minutes is assumed to be sufficient time for repair to be completed in a single-family residence; longer delays are suitable for commercial and apartment buildings in which the repairs are done by staff, rather than the owner. As hereinbefore described, the preferred embodiment alerts the user about a minor water leak condition via green LEDs functioning as serious warnings. To pinpoint the nature of the alarm, an alphanumeric display preferably indicates either an "A" corresponding to an air conditioner leak, an "H" corresponding to a water heater leak, or a "P" corresponding to a pipe leak. It should be clearly understood that other symbols would be used for representing other embodiments involving different types of sensors and alarm conditions.

It will also be appreciated by practitioners in the art that the present invention provides a fail-safe indication that power is being supplied to assure proper water leak detection. Unlike the prior art, which typically requires pressing a test button or the like to ascertain whether a detection apparatus is operating and sufficient power is being supplied to signal its alarm, the present invention preferably provides two LEDs to indicate whether operation is being driven by AC main power or by battery backup. Thus, for proper operation of the present invention, one of these two LEDs must be illuminated; otherwise, immediate action is necessary to resume proper operation. It is within the scope of the present invention, as is common in the art, to provide an alarm for a low battery condition. It will be understood that the present invention contemplates battery operation only during occasional periods of interruption of the normal AC supply. Of course, as is also common in the art, the present invention could be easily modified to enable the backup battery to be recharged during normal AC operation.

Thus, unlike the detection apparatus and methodology taught by Welch, the probes of the present invention will detect water leaks by simply being placed under or near a water-dependent or water-related appliance and/or wrapping the probes around water pipes. No retrofitting whatsoever is prerequisite for embodiments of the present invention to be used in situ.

It has been found that the early warning detection system of the present invention affords opportunities for water leak detection heretofore unknown in the art. One particularly telling example occurred during installation by a plumber of prototype systems into a residence. During this test, prototypes were installed by both a professional plumbers and his assistants, and by a layman. While being installed on a hot water appliance by one of the plumber's assistants— wrapping the fiberglass probes around the incoming and outgoing water pipes—an alarm was activated (on the central control unit) as he started to wrap the probe around the incoming cold water pipe. Summoning the plumber, the assistant opined that the detection device had malfunctioned because there was no evidence of a water leak on the concrete floor or other nearby locations. Nevertheless, upon further investigation, since the hot water appliance was located in a corner of two walls, it became apparent that there was an unnoticed, pre-existing water leak. This leak had been undetected because, rather than leaking water falling to the floor thereby creating a puddle of standing water, leaking water had sprayed outwardly upon the walls behind the hot water appliance. Based upon external deterioration of these walls it became obvious that a pipe had been leaking water for a considerable period of time. Thus, this incident not only demonstrated the efficacy of the present invention, but also enabled a subtle water leak to be discovered before extensive damage would occur to support structures and the like. It will be clear to those skilled in the art that the present invention teaches a water leak detection apparatus and methodology that potentially can eliminate a diversity of appliance-related water leak problems commonly experienced in domestic and industrial environments.

As hereinbefore described, the present invention readily detects a malfunction in the secondary pan in the condenser coil of a central air conditioner. If, however, window air conditioners are used to cool a building and the like, instead of a central air conditioner, the present invention is still capable of delivering its unique combination of early-warning and accurate detection. All that is required under these circumstances is to simply remove the front panel of the window air conditioner unit and then, by lifting the unit, sliding the probes under the inside thereof. The two-probe operation (per appliance) taught by the present inventions may be easily implemented by simply placing both probes on the bottom of the metal encasement, with the probes being placed directly behind the front panel—with the second probe, in turn, being placed behind the first probe.

Of course, condensation will accumulate in a window air conditioner, and, accordingly, when such a unit is installed in a window it is disposed at a downward angle to cause all the accumulated, condensed water to flow toward the rear of the unit and then to drain to the ground through drainage holes in the metal encasement. Similar to the secondary pans of central air conditioning units, this water will also accumulate a gel and other foreign matter over a protracted period of time whereby the drain holes become clogged. Obviously, if these holes are not timely unclogged, the accumulated water will overflow and potentially cause damage to the building by dripping down the wall in front of the air conditioner or in between the outside and inside walls. As hereinbefore suggested, water leakage within walls typically is undetected until a traumatic adverse event occurs. By contrast, the prior art—typified by Welch—is generally unable to accommodate any appliance configuration. That is, in order for Welch to be applied to a window air conditioner unit, one or more of his box water detectors must be placed therein. It should be evident, however, that it is impracticable to properly interconnect the unit's wiring to the Welch detector so as to avoid interfering with the moving fans or to avoid causing vibration of the unit during while operating.

It should be clear to those skilled in the art that another aspect of the present invention is its design to not only reliably detect beginning water leaks, but also to avoid generating false-alarms. That is, if a water detection means is configured to have a bias toward detection of even minute amounts of water in the vicinity of an appliance, allowance preferably should be made for an acceptable threshold before a leak condition is designated via a display, alarm, or the like. Since there is typically residual water associated with a water-dependent appliance, allowance of this threshold is critical for avoiding false-alarms. For instance, a window air conditioner will always have a small amount of water accumulated due to condensation. Thus, if the Welch detector were applied under these conditions, as long as water bridges the contacts, a leak condition would be triggered and the feed water shut off. In the present invention, in addition to allowance being made for a sensitivity threshold (indicating a leak), there is a transition between accumulated water first triggering the minor sensors, and then, should the water leak condition persist, activate the major sensors in the probes allowing enough time to unclog the drainage holes or the like. Obviously, the onset of a water leak is considered to be a "minor" or low condition, while more substantial water being accumulated—typically later in time—is considered to be a "major" or high condition.

Consistent with the fail-safe attributes of the present invention, when a power failure occurs the resident or occupants of a building are made aware thereof by observation of the red battery backup LED being illuminated and the green mains power supply LED being turned off until standard electrical power from the mains is restored. That is, when the red LED is activated it indicates that the 9-volt battery is being utilized to power the water detection system. On the other hand, when the green LED is activated it indicates that the system is being operated using AC from the normal power outlet. As will be understood by those skilled in the art, all LED's that are incorporated into the present invention are preferably normally clear in color and only become illuminated as red or green, or possibly other distinctive colors, when a specific condition triggers underlying circuitry that applies current to the particular LED(s).

Other variations and modifications will, of course, become apparent from a consideration of the structures and techniques hereinbefore described and depicted. Accordingly, it should be understood that the present invention is not intended to be limited by the particular features and structures hereinbefore described and depicted in the accompanying drawings, but that the present invention is to be measured by the scope of the appended claims herein.

What is claimed is:

1. In a building having a plurality of water-dependent appliances and water-carrying pipes, a water leak detection apparatus providing warning of a water leak in at least one of said plurality of water-dependent appliances and said water-carrying pipes, said water leak detection apparatus comprising:

a plurality of flexible probe means for determining the location and extent of said water leak in one of said plurality of water-dependent appliances and said water-carrying pipes;

each of said probe means of said plurality of probe means configured for attachment to at least one of said plurality of water-dependent appliances and said water-carrying pipes;

a central control housing means configured for installation in said building for housing a circuit means and having multiconductor cable means for electrically interconnecting said plurality of water-dependent appliances and said water-carrying pipes with a plurality of sensor means encased within said plurality of probe means, each of said plurality of sensor means coded corresponding to each conductor of said cable means;

said central control housing means having a plurality of display means electrically interconnected with said circuit means for indicating the location and extent of said water leak in said building; and electrical power means interconnected with said central housing means for driving said circuit means.

2. The water leak detection apparatus recited in claim 1, wherein each of said plurality of flexible probe means comprises electrically nonconductive fiberglass cloth means as a base thereof.

3. The water leak detection apparatus recited in claim 2, wherein said nonconductive fiberglass cloth means includes a silicon cloth means affixed to each end and side thereof, for insulating said connection of said plurality of sensor means with said multiconductor cable means.

4. The water leak detection apparatus recited in claim 2, wherein each of said plurality of sensor means comprises a pair of metal rods that create a conductive path when water appears therebetween.

5. The water leak detection apparatus recited in claim 4, wherein said circuit means comprises a plurality of Darlington circuits with each of said plurality of Darlington circuits coupled to one of said plurality of sensor means.

6. The water leak detection apparatus recited in claim 5, wherein said water leak occurring proximal to said plurality of water-dependent appliances and water-carrying pipes causes one of said plurality of Darlington circuits to conduct electricity.

7. The water leak detection apparatus recited in claim 6, wherein said display means comprises a plurality of display windows for displaying the location of said water leak, responsive to the conductivity of said plurality of Darlington circuits.

8. The water leak detection apparatus recited in claim 7, wherein said display means comprises a plurality of illuminating buttons for displaying the extent of said water leak and for displaying whether said power is supplied from a standard AC source or from battery backup, responsive to the conductivity of said plurality of Darlington circuits.

9. The water leak detection apparatus recited in claim 8, wherein said display means comprises an alarm means for generating a sound indicative of said water leak, responsive to the conductivity of said plurality of Darlington circuits.

10. The water leak detection apparatus recited in claim 9, wherein said circuit means comprises a delay means for interrupting said alarm means from generating a sound for a predetermined period of time to allow for said water leak to be remedied.

11. The water leak detection apparatus recited in claim 10, wherein said multiconductor cable means is color-coded for proper interconnection with a corresponding plurality of ports of said circuit means.

12. The water leak detection apparatus recited in claim 11, wherein said display means includes means for indicating an early warning of a minor water leak in said plurality of water-dependent appliances.

13. The water leak detection apparatus recited in claim 12, wherein said plurality of probe means and said central control housing means are releasably attached to said plurality of water-dependent appliances and said water-carrying pipes without requiring retrofitting.

14. The water leak detection apparatus recited in claim 13, wherein said plurality of probe means and said central control housing means are releasably attached to said plurality of water-dependent appliances and said water-carrying pipes without requiring professional installation by plumbers or electricians.

15. The water leak detection apparatus recited in claim 14, wherein said central control means includes remote telephone interface means for providing warning of said water leak in said plurality of water-dependent appliances and water-carrying pipes remotely using existing telephone lines.

16. The water leak detection apparatus recited in claim 15, wherein said remote telephone interface means includes microprocessor means responsive to said location and extent of said water leak, for dialing a telephone number of a plurality of predetermined telephone numbers and communicating a corresponding warning message of a plurality of prerecorded warning messages.

17. The water leak detection apparatus recited in claim 16, wherein said remote telephone interface means further includes speed dial means.

18. The water leak detection apparatus recited in claim 17, wherein said remote telephone interface means further includes telephone redial means for selecting telephone numbers to call when one or more of said telephone lines are busy.

19. The water leak detection apparatus recited in claim 11, wherein at least one said plurality of sensor means is configured to detect and warn of an initial, low water leak prior to detecting and warning of a subsequent, high water leak in at least one of said plurality of water-dependent appliances.

20. The water leak detection apparatus recited in claim 11, wherein each sensor means of said plurality of sensor means is color-coded to be coupled to a corresponding like color-coded cable of said multiconductor cable means.

21. The water leak detection apparatus recited in claim 20, wherein each said color-coded cable of said multiconductor cable means that is coupled to said corresponding color-coded sensor means of said plurality of sensor means is, in turn, coupled to a corresponding like color-coded circuit of said circuit means.

22. The water leak detection apparatus recited in claim 21, wherein a first flexible probe means of said plurality of flexible Probe means configured for determining the location and extent of said water leak in a hot water heater appliance of said plurality of water-dependent appliances and said water-carrying pipes is configured to be disposed beneath said hot water heater appliance and comprises:

a first color-coded sensor means encased within said first flexible probe means and disposed—proximal to a plurality of edges thereof;

a second color-coded sensor means encased within said first flexible probe means and disposed medially of said first color-coded sensor means and said plurality of edges;

a third color-coded sensor means encased within said first flexible probe means and disposed medially of said second color-coded sensor means and said first color-coded sensor means; and a fourth color-coded sensor means encased within said first flexible probe means and disposed centrally of said first, second, and said third color-coded sensor means.

23. The water leak detection apparatus recited in claim 22, wherein said first flexible probe means detects a water leak from said hot water heater appliance when leaking water bridges two of said first, second, third, and fourth color-coded sensor means, one interconnected with a corresponding said Darlington circuit and another not so interconnected, thereby establishing a conductive path therebetween.

24. The water leak detection apparatus recited in claim 23, wherein a first of said plurality of display means displays an alphanumeric symbol responsive to said location of said detection of said water leak from said hot water heater appliance.

25. The water leak detection apparatus recited in claim 23, wherein said first flexible probe means detects an initial, low water leak from said hot water heater appliance when leaking water bridges said second and said third color-coded sensor means.

26. The water leak detection apparatus recited in claim 25, wherein a second of said plurality of display means displays an alphanumeric symbol responsive to said initial extent of said detection of said water leak from said hot water heater appliance.

27. The water leak detection apparatus recited in claim 23, wherein said first flexible probe means detects a subsequent, high water leak from said hot water heater appliance when leaking water bridges said first and said fourth color-coded sensor means.

28. The water leak detection apparatus recited in claim 27, wherein said second of said plurality of display means displays an alphanumeric symbol responsive to said subsequent extent of said detection of said water leak from said hot water heater appliance.

29. The water leak detection apparatus recited in claim 21, wherein a second and third flexible probe means of said plurality of flexible probe means configured for determining the location and extent of said water leak in an air conditioner appliance of said plurality of water-dependent appliances and said water-carrying pipes are configured to be disposed on either side of a secondary catch pan of said air conditioner appliance immediately above the drainage pie thereof, comprise:
- a fifth color-coded sensor means encased within said second flexible probe means and disposed proximal to an outer longitudinal edge thereof;
- a sixth color-coded sensor means encased within said second flexible probe conditioner appliance immediately above the drainage pipe thereof, comprise:
- a fifth color-coded sensor means encased within said second flexible probe means and disposed proximal to an outer longitudinal edge thereof:
- a sixth color-coded sensor means encased within said second flexible probe means and disposed above said fifth color-coded sensor means;
- a seventh color-coded sensor means encased within said third flexible probe means and disposed proximal to an outer longitudinal edge thereof; and
- an eighth color-coded sensor means encased within said third flexible probe means and disposed above said seventh color-coded sensor means.

30. The water leak detection apparatus recited in claim 29, wherein said second and third flexible probe means detect a water leak from said air conditioner appliance when leaking water bridges either of said fifth and seventh color-coded sensor means or said sixth and eighth color-coded sensor means, one interconnected with a corresponding said Darlington circuit and another not so interconnected, thereby establishing a conductive path therebetween.

31. The water leak detection apparatus recited in claim 30, wherein said first of said plurality of display means displays an alphanumeric symbol responsive to said location of said detection of said water leak from said air conditioner appliance.

32. The water leak detection apparatus recited in claim 30, wherein said second and third flexible probe means detects an initial, low water leak from said air conditioner appliance when leaking water bridges said fifth and said seventh color-coded sensor means.

33. The water leak detection apparatus recited in claim 32, wherein said second of said plurality of display means displays an alphanumeric symbol responsive to said initial extent of said detection of said water leak from said air conditioner appliance.

34. The water leak detection apparatus recited in claim 30, wherein said second and third flexible probe means detect a subsequent, high water leak from said air conditioner appliance when leaking water bridges said sixth and said eighth color-coded sensor means.

35. The water leak detection apparatus recited in claim 34, wherein said second of said plurality of display means displays an alphanumeric symbol responsive to said subsequent extent of said detection of said water leak from said air conditioner appliance.

36. The water leak detection apparatus recited in claim 21, wherein a fourth flexible probe means of said plurality of flexible probe means configured for determining the location and extent of said water leak in a water-carrying pipe of said plurality of water-dependent appliances and said water-carrying pipes is configured to be wrapped around said water-carrying pipe, comprises:
- a ninth color-coded sensor means encased within said fourth flexible probe means and disposed proximal to an outer longitudinal edge thereof; and
- a tenth color-coded sensor means encased within said fourth flexible probe means and disposed proximal to the other, opposite outer longitudinal edge thereof.

37. The water leak detection apparatus recited in claim 36, wherein said fourth flexible probe means detects a water leak from said water-carrying pipe when leaking water bridges said ninth and tenth color-coded sensor means, one interconnected with a corresponding said Darlington circuit and another not so interconnected, thereby establishing a conductive path therebetween.

38. The water leak detection apparatus recited in claim 37, wherein said first of said plurality of display means displays an alphanumeric symbol responsive to said location of said detection of said water leak from said pipe.

39. The water leak detection apparatus recited in claim 38, wherein said second of said plurality of display means displays an alphanumeric symbol responsive to said extent of said detection of said water leak from said pipe.

40. The water leak detection apparatus recited in claim 3, wherein said nonconductive fiberglass cloth means is configured to withstand temperatures us to 1000° F.

41. The water leak detection apparatus recited in claim 3, wherein said nonconductive fiberglass cloth means is configured to resist abrasion and tearing attributable to placement proximal to said plurality of water-dependent appliances and said plurality of water-carrying pipes.

42. The water leak detection apparatus recited in claim 41, wherein said nonconductive fiberglass cloth means is constructed from Teflon-coated cloth.

43. The water leak detection apparatus recited in claim 3, wherein said nonconductive fiberglass cloth means further comprises protective cloth means enclosing and insulating joinder of said plurality of sensor means with a corresponding plurality of receptacles enclosed within said fiberglass cloth means, and fixedly attached thereto.

44. The water leak detection apparatus recited in claim 43, wherein said protective cloth means comprises silicone cloth constructed to withstand temperatures up to 2300° F.

* * * * *